US008213421B2

(12) United States Patent
Bitar et al.

(10) Patent No.: US 8,213,421 B2
(45) Date of Patent: Jul. 3, 2012

(54) METHODS AND SYSTEMS FOR EFFICIENT MULTICAST ACROSS A MESH BACKPLANE

(75) Inventors: Nabil N. Bitar, Winchester, MA (US); Thomas A. Hoch, Boxborough, MA (US); Martin Kannampuzha Varghese, Hillsborough, NH (US)

(73) Assignee: Alcatel Lucent, Paris (FR)

( * ) Notice: Subject to any disclaimer, the term of this patent is extended or adjusted under 35 U.S.C. 154(b) by 1751 days.

(21) Appl. No.: 10/838,782

(22) Filed: May 3, 2004

(65) Prior Publication Data
US 2005/0243825 A1 Nov. 3, 2005

(51) Int. Cl.
*H04L 12/50* (2006.01)
*H04L 12/56* (2006.01)
*H04J 3/26* (2006.01)

(52) U.S. Cl. ........ 370/388; 370/390; 370/413; 370/432; 370/474

(58) Field of Classification Search .................. 370/388, 370/390, 413, 432, 474
See application file for complete search history.

(56) References Cited

U.S. PATENT DOCUMENTS

| | | | | |
|---|---|---|---|---|
| 5,287,346 A | * | 2/1994 | Bianchini et al. | 370/390 |
| 6,094,430 A | * | 7/2000 | Hoogenboom | 370/375 |
| 6,731,638 B1 | * | 5/2004 | Ofek | 370/395.4 |
| 7,184,440 B1 | * | 2/2007 | Sterne et al. | 370/395.52 |
| 7,298,738 B1 | * | 11/2007 | Parruck et al. | 370/360 |
| 7,519,054 B2 | * | 4/2009 | Varma | 370/388 |
| 7,724,738 B2 | * | 5/2010 | Chao et al. | 370/390 |
| 7,852,829 B2 | * | 12/2010 | Chao et al. | 370/352 |
| 7,894,343 B2 | * | 2/2011 | Chao et al. | 370/235 |
| 2002/0080720 A1 | * | 6/2002 | Pegrum et al. | 370/236 |
| 2003/0058880 A1 | * | 3/2003 | Sarkinen et al. | 370/413 |
| 2004/0246977 A1 | * | 12/2004 | Dove et al. | 370/395.61 |
| 2005/0207436 A1 | * | 9/2005 | Varma | 370/412 |

* cited by examiner

*Primary Examiner* — Alpus H Hsu
(74) *Attorney, Agent, or Firm* — Capitol Patent & Trademark Law Firm, PLLC

(57) ABSTRACT

The present invention relates to communications networks, and more particularly to packet switching and routing devices used in communication networks that provide efficient multicast services. The invention provides methods and systems for switching and routing of multicast data packets in two stages. In particular, in the first stage a received multicast data packet is in an internal multicast operation by an ingress line card across a switching fabric to a plurality of egress line cards through which multicast destinations of the packet are reachable. In a second stage each egress line card further replicates the data packet to the actual transmission links across which the multicast group are reachable. This invention also includes system performing this method. The invention reduces the service time for the multicast packets making it the same as for the unicast packets, and provides for better system throughput in comparison to traditional systems.

10 Claims, 6 Drawing Sheets

METHODS AND SYSTEMS FOR EFFICIENT MULTICAST ACROSS A MESH BACKPLANE

This application incorporates by reference in their entireties and for all purposes the following patent applications, all of which are owned or subject to a right of assignment to the assignee of the present application and all of which were filed concurrently together with the present application: (1) the application titled "SYSTEMS AND METHODS IMPLEMENTING 1+1 AND N:1 LINE CARD REDUNDANCY", by Bitar et al. (application Ser. No. 10/838,781, filed on May 3, 2004) (hereafter, the "Redundancy application"); (2) the application titled "VARIABLE PACKET-SIZE BACKPLANES FOR SWITCHING AND ROUTING SYSTEMS", by Bitar et al. (application Ser. No. 10/838,780, filed on May 3, 2004) (hereafter, the "Variably-sized FDU application"); (3) the application titled "A UNIFIED SCHEDULING AND QUEUING ARCHITECTURE FOR A MULTISERVICE SWITCH", by Bitar et al. (application Ser. No. 10/838,788, filed on May 3, 2004, and issued as U.S. Pat. No. 7,304,944) (hereafter, the "Scheduler application"); and (4) the application titled "SYSTEMS AND METHODS FOR SMOOTH AND EFFICIENT ROUND-ROBIN SCHEDULING", by Bitar et al. (application Ser. No. 10/838,778, filed on May 3, 2004, and issued as U.S. Pat. No. 7,408,946) (hereafter, the "SEWDRR application").

FIELD OF INVENTION

The present invention relates to communications networks, and more particularly to packet switching and routing devices used in communication networks that provide efficient multicast services.

BACKGROUND OF INVENTION

Multicast is a network service that replicates a packet (or cell or generally a network data unit) sent from a multicast source to a plurality of multicast destinations, where the multicast source and multicast destinations are collectively called a multicast group. FIG. 1 illustrates an exemplary network with a plurality of network elements (NE), such as switching and routing nodes 10, interconnected with network links, and to which terminal nodes, such as end user equipment 8 and 12 are connected. After user equipment 12, for example, sends a multicast packet to the network, the packet is forwarded and/or replicated by NE so that a copy is ultimately received by all the user equipment 12 in the multicast group. Because multiple group members can be reached by the same network path (network elements connected by network links), a multicast packet may be forwarded once over paths shared by multiple group members and only later replicated for remaining paths that are no longer shared. Thus multicast services uses network path bandwidth efficiently.

However, multicast service requires NEs with the capability for network data unit replication. Briefly, switches and routers include ingress line cards that receive packets, egress line cards that transmit packets, and a switch fabric interconnecting the ingress and egress cards. Present and prior multicast implementations have varied in the network component or element selected to carry out packet replication. In some implementations, replication is performed by providing this special capability only in the ingress line cards, while in other implementation, replication has been performed by providing this special capability only in the switch fabric.

Each of these design choices has costs in memory, memory bandwidth, and fabric transmission bandwidth. If the line cards perform replication, then switch fabric bandwidth is required to transmit each replicated copy. If N copies are required and each copy requires a transmission time T through the switch fabric, then the switch fabric is busy for a total service time N*T. However, if the switching fabric performs the replication, then not only must the fabric include the special-purpose replication hardware but it also must transmit each replicated copy, a total service of N*T in the previous example.

Accordingly, known network elements do not efficiently implement multicast packet replication which burdens the fabric throughput.

SUMMARY OF THE INVENTION

The present invention overcomes this drawback of known NEs by providing systems and methods for replicating multicast packets in two stages within a switch or router. In a first stage, data units are replicated in the ingress line cards and sent once through the switching fabric to only those egress line cards from which one or more multicast group members can be reached (an internal multicast operation). In a second stage, data packets are replicated in the egress line cards and sent once only through the physical or logical network links over which one or more multicast group members can be reached. The first stage replication may be performed by issuing one software command, possibly through proper encoding in the internal data unit header and having the fabric-interface physical layer on the line card perform the multiple writes through the switch fabric. Thus, in this invention multicast packets do not create memory, memory bandwidth, and fabric bandwidth overheads in the line cards or in the switch fabric, and multicast services can be processed with greater efficiency.

An exemplary switch or router in accordance with the present invention includes one or more ingress line cards, one or more egress line cards, a switching fabric connecting the ingress and egress line cards, and one or more control units which performs the methods of this invention. In one aspect, the two stages include replicating a multicast data packet across the switching fabric from an ingress line card to a plurality of egress line cards having the ports through which the destinations of the packet are reachable, and then replicating multicast packets on the egress card to those output ports. In further aspects, the system also includes selecting the FDU from a queue in the memory of the ingress line card, writing the FDU on each of the lines of the fabric leading to the plurality of the egress line cards.

This invention also includes various improvements, such as embodiments that cooperate with internal flow control in an NE.

Citation or identification of any reference in this section or any section of this application shall not be construed so that such reference is available as prior art to the present invention. Similarly, description of the technological arts shall not be construed as an admission of the contents of the prior art.

BRIEF DESCRIPTION OF THE DRAWINGS

The present invention may be understood more fully by reference to the following detailed description of one of the exemplary embodiments of the present invention, illustrative examples of specific embodiments of the invention, and the appended figures in which.

DETAILED DESCRIPTION OF THE EMBODIMENTS

Figure 1:
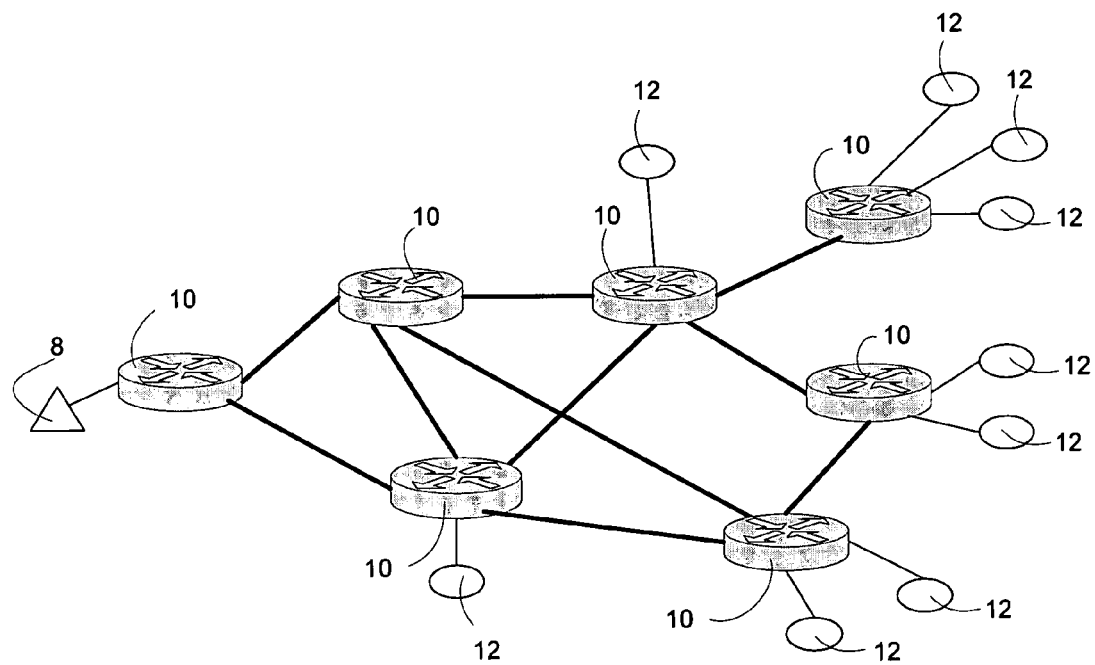
FIG. 1 illustrates an exemplary multicast operation.
Figure 2A:
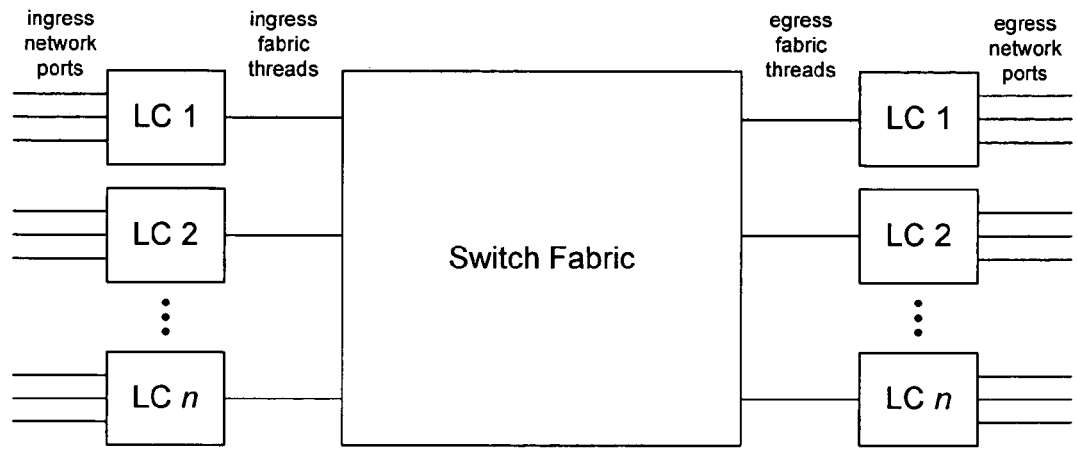
FIGS. 2A-B illustrates an switch/router with switching fabric.
Figure 2B:
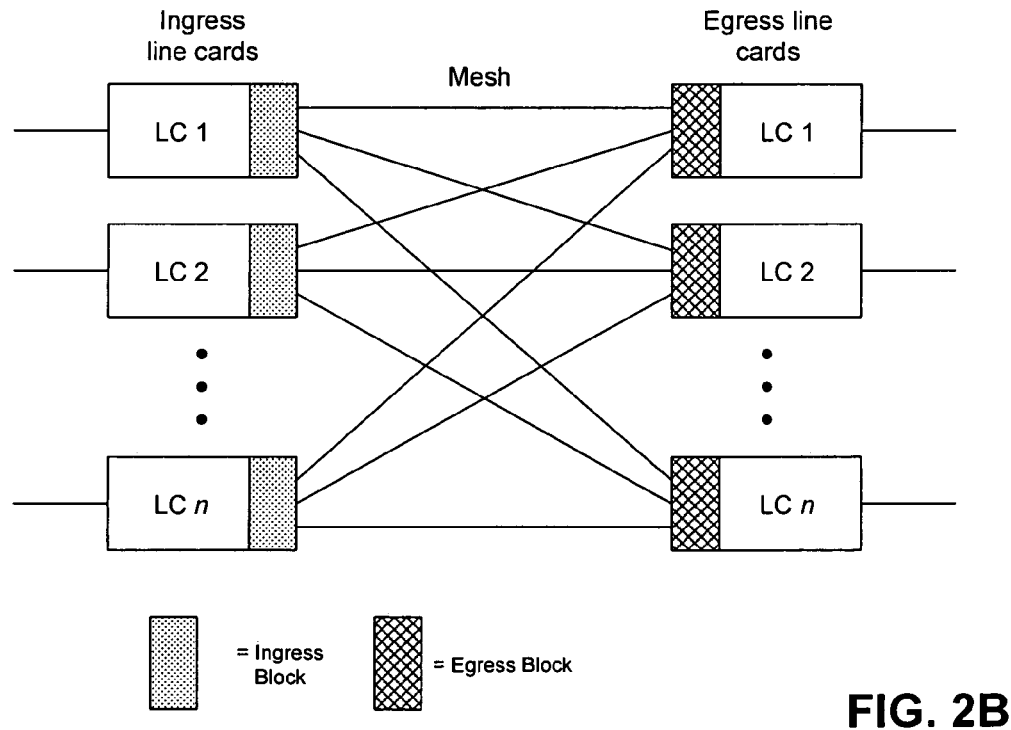

To efficiently and properly appreciate the present invention, the following description is largely limited to an exemplary switch/router architecture illustrated in FIGS. 2A-B and to support of the Internet Protocol (IP) and Asynchronous Transfer More (ATM) network service protocols. However, the specific embodiments (described) are not intended to limit the scope of the invention. It will be readily appreciated that the present invention is applicable to other switch router architectures that have separate, interconnected ingress and egress elements, and to other network service protocols, such as frame relay (FR), multi-protocol label switching (MPLS), Ethernet, and the like. Also, the term "packet" is used herein to refer to a network data unit, such as an IP packet, an Ethernet frame, an ATM cell, a FR frame etc. The term (input/output) "transmission link" is used herein to refer to a physical (such as an optical fiber link) and/or logical (such as a virtual path or channel) links.

Turning to an exemplary switch/router architecture, FIG. 2A illustrates an exemplary switch/router architecture in accordance with the present invention. The switch/router has a number (one or more) of line cards (LC 1-LC n) each with input and output ports (one or more) connected to network links (referred to as ingress network ports and egress network ports, respectively). The terms "ingress" and "egress" are used herein to refer to the direction of the traffic flow. The line cards are interconnected by a switch fabric to which they are linked by ingress and egress fabric threads. Typically, the ingress and the egress line cards are two logical parts of a single physical line card. However, they may have two separate physical devices serving the ingress and egress functions. The term "thread" is used herein to refer to a preferably serial link that connects a line-card (occupying a slot in a NE) to the NE switch fabric or backplane. In generic case, a connection through the switch comprises a thread from an ingress card to the switch fabric, a link through the switch fabric, and a thread from the switch fabric to the egress line card. In the preferred embodiment, with a mesh switch fabric, the connection consists of a thread between the two line cards.

With N threads, each with a bandwidth of M bits-per-second (bps), the fabric can have up to N*M bps bandwidth if it is capable of simultaneously switching N*M bps. To achieve this rate, the switching fabric first must be capable of establishing multiple internal connections (known as a connection matrix) that enable each thread in the system to transmit to another selected thread at the thread data rate (M bps) every data unit time. The data unit time equals the size of the maximum fabric data unit (FDU) divided by thread data rate. Second, the thread speed must be at least M bps. An exemplary switch/router embodiment, as described in the "Variable-size FDU" application, provides for variably-sized FDUs to efficiently support multiple network protocols.

FIG. 2B illustrates in more detail that each line card (LC 1-LC n) includes an ingress block with up to N ingress ports (where N is the number of line cards in a system, the line cards typically being held in system slots) and an egress block also with up to N egress ports. These ports connect to threads capable of transmitting to all the line cards in the system (including self-connections) so that the backplane is preferably fully connected. It should be understood that the invention is also applicable to non-fully connected architectures. The ingress and egress blocks also include scheduler functions, queuing systems, and transmission and receiving devices that work in concert so that the switch/router backplane achieves the desired behavior including meeting protocol QoS goals. An exemplary embodiment of the ingress and egress block scheduling functions and queuing systems is described in the "Scheduler" application.

Figure 3A:
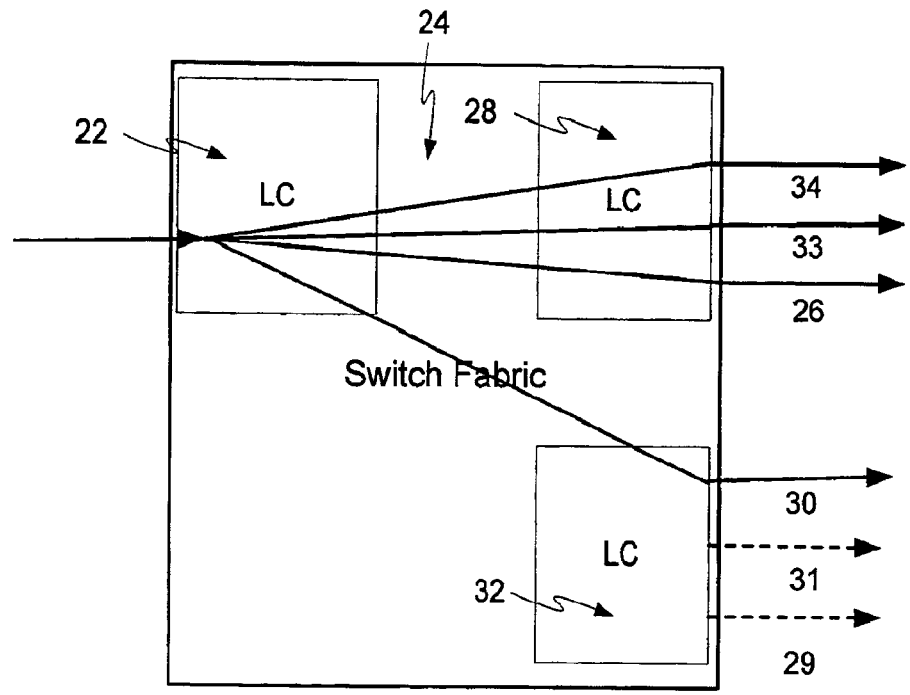
FIGS. 3A-B illustrates the improved multicast method.
Figure 3B:
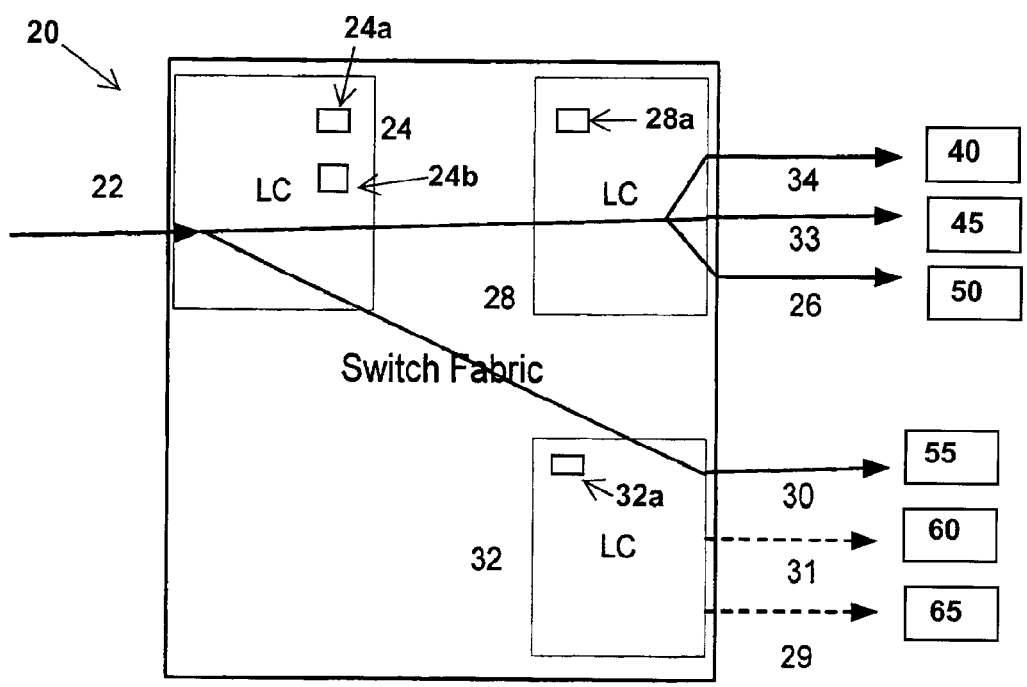

Next, FIGS. 3A-B illustrate the packet replication performed in order to implement multicast services, how prior art NEs have implemented this replication, and how this invention implements this replication. These figures illustrate a multicast packet that arrives over link 22 at line card 24 and that must be replicated and transmitted on over links 26, 33, and 34 from line card 28 and link 30 from line card 32, these being the links leading to members of the relevant multicast group. This packet is not transmitted over links 29 and 31 because these links do not lead to any group members. Thus the NE must arrange for the four-fold replication of the data unit.

In the past, replication has been handled, for example, by ingress line cards as in FIG. 3A. Here, line card 24 accordingly makes four replicas of the packet which it transmits through the switch fabric, three to line card 28 and one to line card 32. Then line card 28 merely sends its three replicas on over transmission links 26, 33, and 34; and line card 32 sends its single replica on over transmission link 30. This method of multicast implementation clearly uses considerable bandwidth in both the switch fabric and egress line cards, such as line card 28, which are connected multiple transmission links.

In contrast, FIG. 3B illustrates the multicast operation of the present invention which is performed in two separate stages. In FIG. 3B, line cards 24, 28 and 32 are in a system 20 which is interconnected with systems 40, 45, 50, 55, 60 and 65 in a network. In the first stage, the ingress line card performs a spatial multicast across the switch fabric to those egress line cards with attached links leading to multicast group members. In this internal multicast, only one copy of the multicast packet is sent to each line card that must transmit the multicast packet on over output transmission links. Thus in this example, line card 24 multicasts one replica of the received packet to line card 28 and one replica to line card 32. In the second stage, each destination egress line card replicates its received multicast packet (e.g., IP packet, ATM cell) and transmits these further replicas on over the transmission links and/or logical connections leading to multicast group members. Thus here, line card 28 makes three replicas of its received multicast packet and sends them over output transmission links 26, 33, and 34. Line card 32 merely need send its received multicast packet and sends them over output transmission link 30. Replication and routing of multicast packets can be controlled by one or more control units, such as ingress control unit 24*a* and egress control units 28*a* and 32*a*. The ingress control unit 24*a* can store a received multicast packet in memory 24*b* and select a stored multicast packet from the memory 24*b* for replication.

Figure 4:
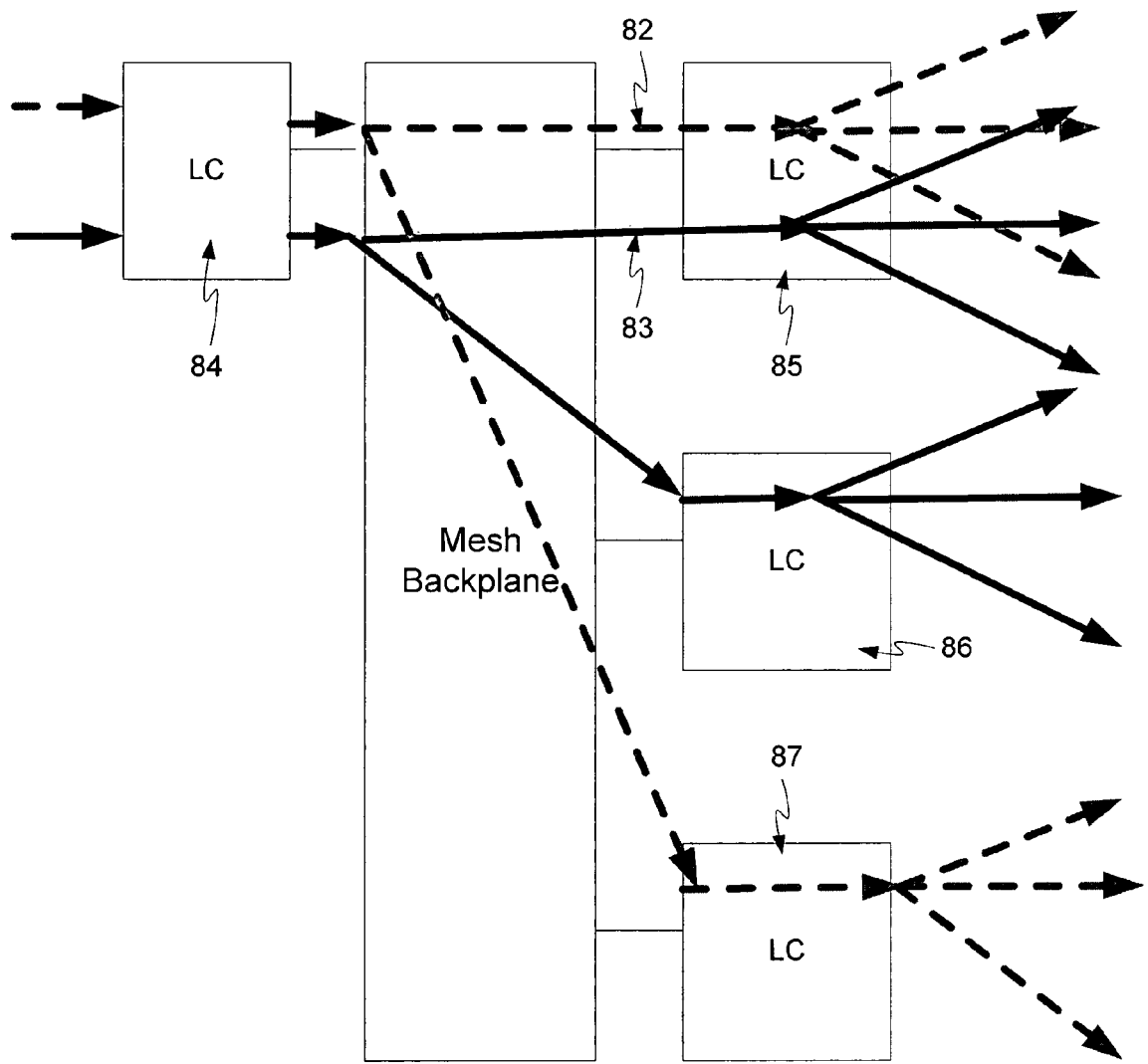
FIG. 4 illustrates the improved multicast method.
Figure 5:
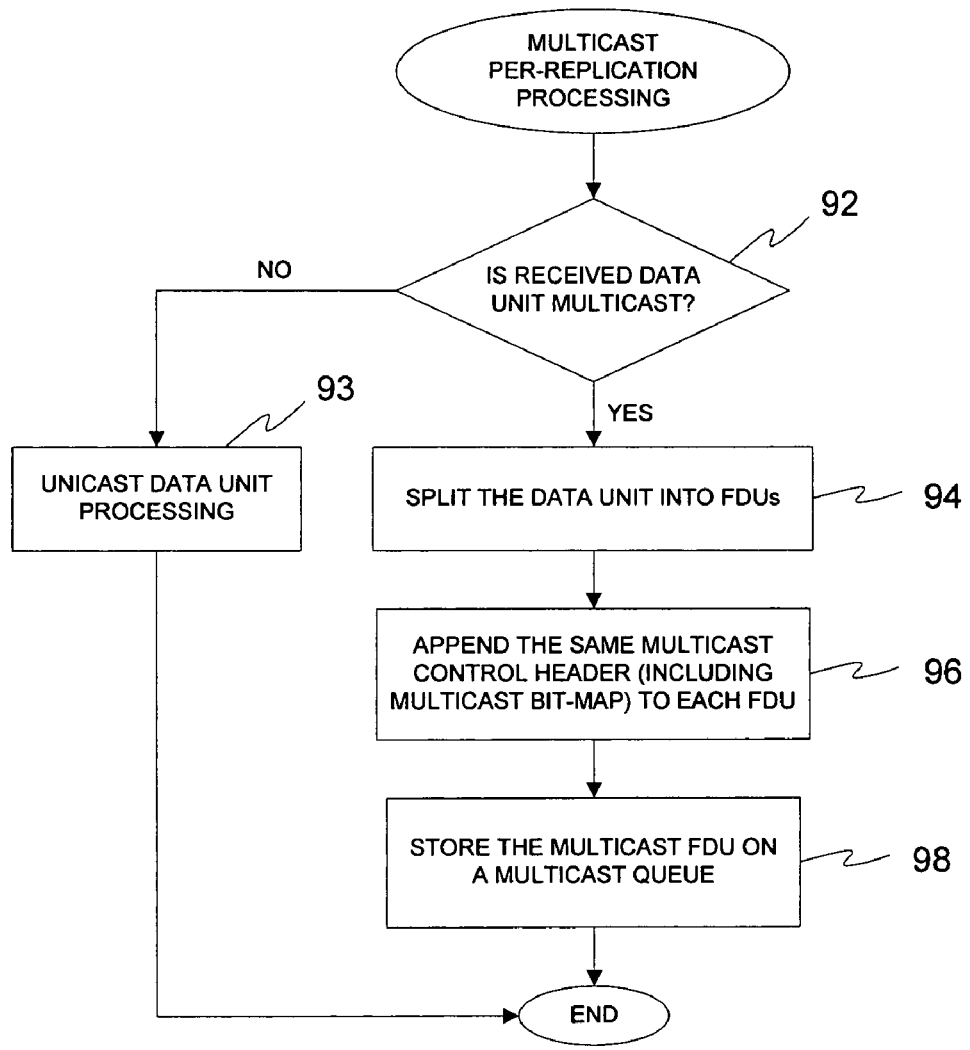
FIG. 5: illustrates the details of a multicast data unit processing on the ingress line card in flow diagram.

FIG. 4 further illustrates the present invention. Here, two simultaneous multicast operations are processed, the first over the multicast transmission path 83 (solid lines) and the second over the multicast transmission path 82 (dashed lines) within the NE. Multicast processing begins when a "solid" multicast packet arrives at ingress card 84 destined for the solid path and a "dashed" multicast packet arrives at this ingress card destined for the dashed path. Since the solid multicast path has next network nodes attached via output transmission links to line cards 85 and 86, line card 84 replicates the solid packet received from line card 84 and sends one replica to each of line cards 85 and 86. And since the dashed multicast path has next network nodes attached via output transmission links to line cards 85 and 87, line card 84 replicates the dashed packet and sends one replica to each of line cards 85 and 87. Next, line card 85 replicates three copies of the solid packet received from line card 84 and sends the replicas on over three attached transmission links to the next network nodes on the solid multicast path. Multicast processing is completed by line cards 82 and 87 doing the same for the dashed multicast path Operation of exemplary embodiments of this invention is now described in more detail. A flow diagram illustrating the processing of the multicast data units on the ingress line cards is shown in FIG. 5. Upon packet arrival at an NE, the ingress block functions on the line card determine how to forward the packet. For an IP packet for example, the destination IP address contained in the packet header is looked up in an IP forwarding table to find the address of the next node to send this packet. If the packet is a multicast packet, as determined in step 92, the destination IP address will belong to the multicast address family, and the corresponding forwarding table entry identifies: (1) a multicast group identifier (MID) established local to the NE; and (2) indications of the line cards having egress functions that must receive replicas of the packet for transmission onwards. Such an indication is preferably a bit map with one bit for each line card whose setting identifies the cards to receive a replica of the multicast packet. For an ATM cell, the VPI/VCI fields in the ATM header are looked up in an ATM connection table to obtain a connection state, which includes an indication (a bit) whether the connection is multicast, and if so a multicast circuit identifier (or multicast group identifier) and indications of the line cards having egress functions that must receive replicas of the packet for transmission onwards. This indication may be a bit map as for IP. If the packet was determined to be a unicast packet in step 92, the unicast processing, not related to this invention, is performed in step 93.

Before a packet is transmitted on the switch backplane, it is segmented in step 94, so that each segment may be encapsulated in a fabric data unit (FDU) of fixed or preferably variable size. A packet whose size does not exceed the maximum FDU payload length is encapsulated in a single FDU. In addition to a packet fragment, the FDU includes a control header that informs the backplane how to treat and forward the FDU. The multicast control header is appended to each FDU in step 96. When a multicast packet is encapsulated in multiple FDUs, each of these FDUs may carry the same control header information. According to this invention, the control header relevant for multicast may include: (1) an indication of the packet's QoS class of the service; (2) an indication (e.g. a bit) that this is a multicast packet identifier; (3) a multicast group identifier; and (4) a multicast-bit map (identifying the egress line cards to receive this packet). The latter may be indirectly identified by control header information, Also, the control header may contain further information.

In step 98, FDUs are then queued and scheduled according to relevant characteristics, including whether or not they are carrying multicast data units, for transmission across the mesh backplane. For multi-service operation, such as simultaneous ATM and IP, the exemplary scheduling and queuing architecture is described in the "Scheduler" application. In this exemplary architecture, there is one multicast queue per service type (ATM or IP) and per QoS class within that service type. Further, for a given QoS class within service type, the scheduler described in the "SEWDRR" application arbitrates between unicast and multicast traffic and divides backplane bandwidth in a configurable manner.

In one exemplary embodiment a multicast FDU may be queued in a QoS-based multicast queue as described in "Scheduler" application. The multicast bit, the service type (e.g., IP, ATM), and the service-specific QoS class are used to identify a table entry that contains the proper queue identifier (QID). The QID then points to a queue data structure in memory using a key formed as "multicast_bit.service_type.QoS_class". The multicast bit is used as an offset to a section of the table that contains multicast QIDs, and the service type is used to offset into a subsection of the multicast section, whereas the QoS-class within the service-type is used to extract the QID within that section.

Figure 6:
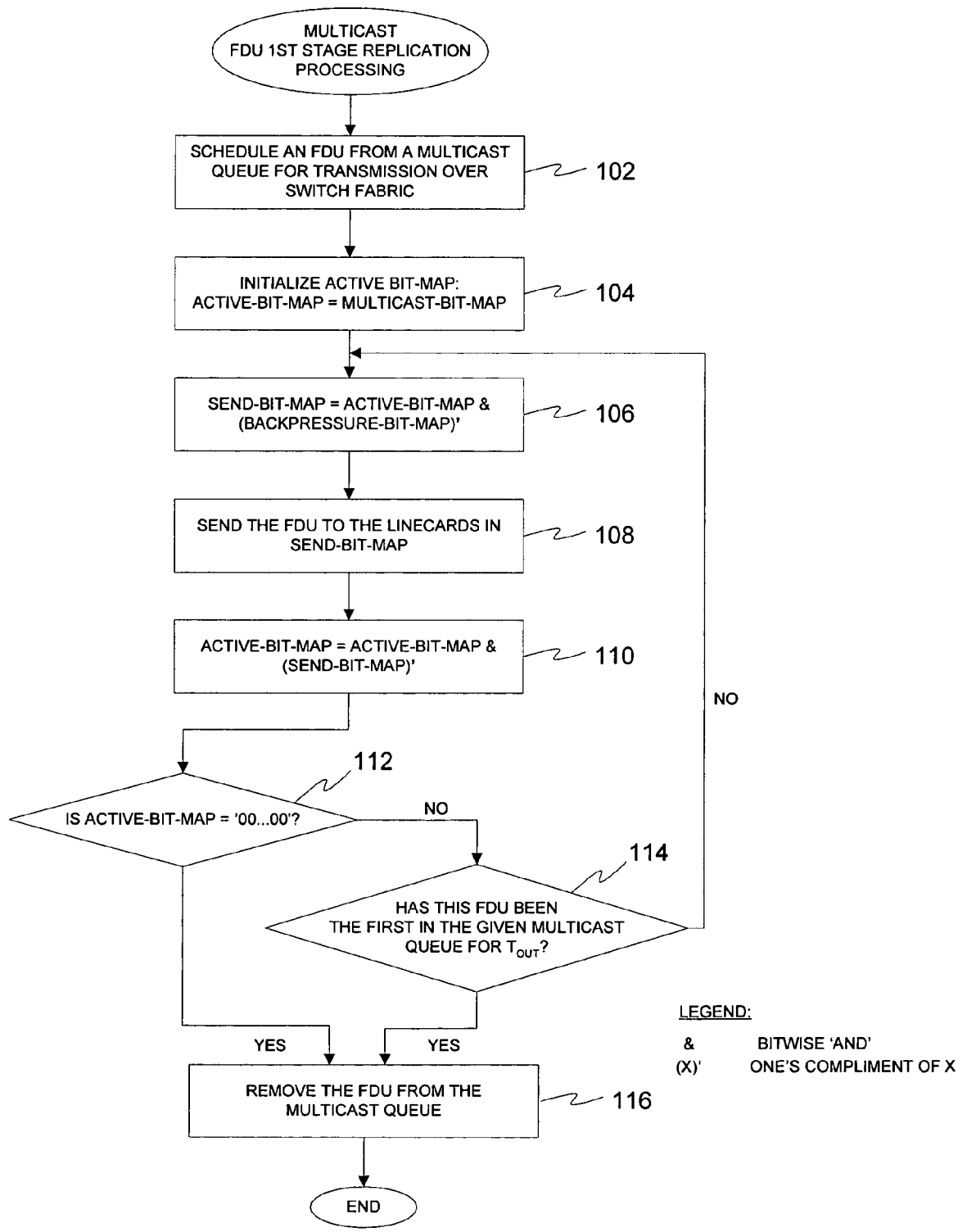
FIG. 6: illustrates the details of the multicast data units replication over the switch fabric.

A flow diagram illustrating the replicating of the multicast FDUs over the switch fabric is shown in FIG. 6. In step 102, a scheduler selects a multicast FDU (identified by the multicast bit in the control header) for transmission over the backplane. In step 104, the multicast bit map in the FDU header is used to retrieve the initial active multicast map, which has bits corresponding to line cards to receive this FDU. A line card is indicated to receive a replica of the packet if at least one multicast group member is reachable via that line card. Actually replicating an FDU to the correct line cards, may be done at the hardware level by a single command that indicates to the backplane hardware the FDU and the line cards to receive the FDU. This is known as an "enable-write" command that enables the writing of the FDU to each thread leading to each indicated egress line card (that should receive the FDU). The physical layer, that is the backplane hardware, then performs the indicated writing without further software command. In this manner, transmitting an FDU to multiple line cards does not require increased memory bandwidth or scheduling cycles in the ingress block of a line card. It is generally no more expensive than a unicast FDU. Thereby, multicast transmission does not require any increased hardware performance for ingress block processing.

The present invention can also be applied in NEs having internal flow control between ingress and egress line cards. Such flow control (also known as backpressure from the egress card to the ingress card) prevents over-commitment of egress card resources and possible packet loss. When there is no backpressure indicated, a multicast FDU is sent to all line card members indicated in the FDU multicast bit-map and then removed from the multicast queue. However, an egress line card, when its resources are nearly or fully committed, may assert a "backpressure" signal to the ingress line cards so that they will not send further FDUs until sufficient egress-card resources become available. Backpressure may be asserted, as described in "Scheduler" application, to the ingress line cards on a per service type and per QoS class within service type basis, when the corresponding service and QoS queues at the egress line card exceed a threshold size. Then FDU replication to a line card that has asserted backpressure for the QoS class and service type of the FDU should be avoided.

In the absence of backpressure, the bandwidth needed by a multicast packet stream on ingress is equal to the incoming stream bandwidth. In the presence of backpressure, since egress slots assert backpressure asynchronously, it may happen that an FDU will be transmitted across the switch fabric multiple times, requiring more bandwidth, before it is finally sent to all destination line cards. In the worst case, an FDU could possibly be replicated to all N line cards in an NE and if the multicast packet stream (reserved) bandwidth is B, the maximum bandwidth needed will be N*B. This problem may be controlled by using the "overspeed" factor B in scheduler configuration to account for the possibility of such multiple dequeue operations of the same multicast FDU. The overspeed factor may be further controlled by an NE operator as a function of the number of slots and would have a default value. In the preferred embodiment, where the mesh fabric is used the invention requires no overspeed is required in the fabric, and the time to transmit a single replica from ingress to egress will be the same as for the N replicas, provided there is not backpressure.

A further embodiment for handling backpressure provides a dynamic (or active) bit map that is stored with an FDU at the head of each multicast queue and that is initialized to the bit map indicating the egress cards to receive the head FDU. In this embodiment, a backpressure bit map is also maintained which indicates (by a "1" bit) which egress cards have asserted backpressure and may not receive further FDUs. Then, whenever the head FDU is scheduled and selected for backplane transmission, its active map is and-ed bit-wise with the one's complement of the backpressure map, as shown in step 106 of FIG. 6, and transmitted in step 108 (for example by an enable-write command) to the egress line cards with corresponding bits set to "1" in the resulting map (also called send-bit map, indicating that an egress card should receive this FDU and that it has not asserted backpressure). In step 110, the one's complement of this send-bit map is then computed and and-ed with the previous active map to become the next active map. If this next active map has no "1" bits, then, in step 112, the FDU has been sent out to all required egress line cards and it can be removed from the head of the multicast queue. Otherwise, "1" bits in the new active map indicate egress line cards that still should receive this FDU. In this embodiment, in each scheduling, only the egress line cards will receive a replica of the FDU that have not yet already received a replica.

Further, backpressure may result in "head-of-line blocking." If an ingress line card has an FDU of a particular QoS class and destined for a particular egress card at the head of a multicast queue, and if that particular egress card asserts backpressure for that QoS class, that FDU will not be selected for backplane transmission. Therefore, all subsequent FDUs on that multicast queue are blocked. To obviate head-of-line blocking, one embodiment of this invention provides a separate queue for every multicast group, so that traffic is blocked only per each multicast-group. Because this embodiment may require considerable hardware resources (memory), one embodiment may provide instead a timeout associated with the FDU at the head of a multicast queue. An FDU cannot remain at the head of a multicast queue (and selected for transmission) for longer than the timeout period, as shown in step 114. Hence, if timeout expires before the FDU is replicated to all intended egress cards, the FDU is removed from the multicast staging queue (dropped), as shown in step 116.

The invention described and claimed herein is not to be limited in scope by the exemplary embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A system for switching or routing data packets, the system comprising:
   one or more ingress line cards having one or more input ports;
   one or more egress line cards having one or more output ports;
   a switch fabric; and
   one or more control units comprising control units at the ingress line cards and control units at the egress line cards, wherein the control units at the one or more ingress line cards,
     segment a multicast packet into one or more fabric data units (FDU) prior to sending across the switch fabric,
     switch or route the segmented, multicast data packet from an input port to an output port across the switch fabric in two or more separate stages of packet replication,
     in a first stage, create one or more first replicas of the multicast data packet received from one of the input ports by one of the ingress line cards, and
     send each first replica across the switch fabric from a receiving ingress line card to the one or more egress line cards,
     wherein destinations of the multicast data packet are reachable in the first stage, and
     wherein at most one replica among the one or more first replicas is sent to any one egress line card among the one or more egress line cards, and the control units at the one or more egress line cards reassemble the multicast packet from FDUs received after being sent across the switch fabric,
   wherein a given egress line card among the egress line cards may indicate that it is unavailable to receive FDUs, and wherein the control units at the ingress line cards do not send an FDU to the given egress line card if the given egress card has indicated that it is unavailable to receive FDUs.

2. The system of claim 1 wherein the one or more control units at the egress line cards, in a second stage, further: create one or more second replicas of the first replicas of the multicast data packet received from the switch fabric by the egress line cards, and send each second replica of the multicast data packet from the receiving egress line card to each output port through which the destinations of the multicast data packet are reachable.

3. The system of claim 1 wherein, in the first stage, the control units at the one or more ingress line cards further store a received multicast data packed into memory of the ingress line card, and select a stored multicast data packet from the memory of the ingress line card.

4. A system for switching or routing data packets, comprising:
   one or more ingress line cards having one or more input ports;
   one or more egress line cards having one or more output ports;
   a switching fabric, and
   one or more control units, wherein the control units switch or route a multicast data packet from an input port to an output port across the switching fabric in two or more separate stages, such that:
     in a first stage, at least one control unit of the one or more control units receives a multicast data packet into one of the ingress line cards from an input port and segments the multicast packet into one or more replica fabric data units (FDUs) prior to sending across the switch fabric, and sends one or more first replicas of the multicast data packet to the egress line cards having output ports through which destinations of the multicast data packet are reachable, and in a second stage, at least one control unit of the one or more control units receives the first replica of the multicast data packet from the switch fabric into the egress line cards and reassembles the multicast packet from FDUs, and sends one or more second replicas of the multicast data packet from each receiving egress line card to each output port through which the destinations of the multicast data packet are reachable, wherein a given egress line card among the egress line cards may indicate that it is unavailable to receive FDUs, and wherein the at least one control unit, at the ingress line cards, does not send an FDU to the given egress line card if the given egress line card has indicated that it is unavailable to receive FDUs.

5. A method for switching or routing of data packets comprising the steps of:

receiving into an ingress line card a multicast data packet from an input port, segmenting the multicast packet into one or more first replica, fabric data units (FDU);

sending each first replica FDU across a switch fabric from the receiving ingress line card to egress line cards having output ports through which destinations of the multicast data packet are reachable;

receiving a first replica of the multicast data packet from the switch fabric into a receiving egress line card among the egress line cards;

reassembling the multicast data packet from the one or more first replica FDUs into one or more second replicas after being sent across the switch fabric; and sending each second replica of the multicast data packet from the receiving egress line card to each output port through which the destinations of the multicast data packet are reachable, wherein a given egress line card among the egress line cards may indicate that it is unavailable to receive FDUs, and wherein the step of sending first replicas further comprises not sending an FDU to the given egress line card if the given egress card has indicated that it is unavailable to receive FDUs.

6. The method of claim 5 wherein the segmenting step is performed independently by one or more control units present on the ingress line card, and wherein the step of reassembling is performed independently by one or more control units present on one of the egress line cards.

7. The method of claim 5 wherein receiving a multicast data packet from an input port further comprises storing a received multicast data packed into memory of the ingress line card, and wherein the step of sending first replicas further selects a stored multicast data packet from the memory of the ingress line card.

8. A method for switching or routing data packets comprising the steps of:

receiving a multicast data packet from an input port into an ingress line card;

segmenting the multicast packet into one or more first replica fabric data units (FDUs);

sending one or more first replicas of the multicast data packet to egress line cards having output ports through which destinations of the multicast data packet are reachable, wherein each of the one or more first replicas of the multicast data packet are formed by the one or more first replica FDUs, and wherein only one first replica of the multicast data packet is sent to each egress line card;

receiving the one or more first replicas of the multicast data packet from a switch fabric into the egress line cards;

reassembling the multicast data packet from the one or more first replica FDUs; and sending one or more second replicas of the multicast data packet from the receiving egress line card to each output port through which the destinations of the multicast data packet are reachable, wherein a given egress line card among the egress line cards may indicate that it is unavailable to receive FDUs, and wherein an FDU is not sent to the given egress line card if the given egress card has indicated that it is unavailable to receive FDUs.

9. A network for switching or routing data packets, the network comprising a plurality of interconnected systems, wherein one or more of the systems comprise:

one or more ingress line cards having one or more input ports;

one or more egress line cards having one or more output ports;

a switching fabric; and one or more control units, wherein the one or more control units switch or route a multicast data packet that has been segmented into one or more fabric data units (FDU) from an input port among the one or more input ports to an output port among the one or more output ports across the switching fabric in two or more separate stages of packet replication, wherein the control units in a first stage, create one or more first replicas of the multicast data packet received from one of the input ports by one of the ingress line cards, and send each first replica across the switching fabric from a receiving ingress line card to the one or more egress line cards, wherein destinations of the multicast data packet are reachable in the first stage, and wherein at most one replica among the one or more first replicas is sent to any one egress line card among the egress line cards, wherein a given egress line card among the one or more egress line cards may indicate that it is unavailable to receive FDUs, and wherein an FDU is not sent to the given egress line card if the given egress line card has indicated that it is unavailable to receive FDUs.

10. The network of claim 9 comprising two or more said interconnected systems.

* * * * *